(12) United States Patent
Hajjari et al.

(10) Patent No.: US 10,233,724 B2
(45) Date of Patent: Mar. 19, 2019

(54) DOWNHOLE VALVE UTILIZING DEGRADABLE MATERIAL

(71) Applicant: Schlumberger Technology Corporation, Sugar Land, TX (US)

(72) Inventors: Mohammad Hajjari, Sugar Land, TX (US); Manuel P. Marya, Sugar Land, TX (US); Lawrence J. Leising, Missouri City, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 410 days.

(21) Appl. No.: 14/653,680

(22) PCT Filed: Dec. 19, 2013

(86) PCT No.: PCT/US2013/076585
§ 371 (c)(1),
(2) Date: Jun. 18, 2015

(87) PCT Pub. No.: WO2014/100421
PCT Pub. Date: Jun. 26, 2014

(65) Prior Publication Data
US 2015/0369003 A1    Dec. 24, 2015

Related U.S. Application Data

(60) Provisional application No. 61/739,066, filed on Dec. 19, 2012.

(51) Int. Cl.
*E21B 34/06* (2006.01)
*E21B 34/14* (2006.01)
(Continued)

(52) U.S. Cl.
CPC .......... *E21B 34/063* (2013.01); *E21B 29/002* (2013.01); *E21B 34/12* (2013.01);
(Continued)

(58) Field of Classification Search
CPC ........ E21B 34/12; E21B 34/063; E21B 34/14; E21B 2034/007; E21B 23/006
See application file for complete search history.

(56) References Cited

U.S. PATENT DOCUMENTS 3,007,523 A    11/1961    Vincent
4,341,272 A    7/1982    Marshall
(Continued)

FOREIGN PATENT DOCUMENTS

RU    2197596 C2    1/2003
RU    35822 U1    2/2004
(Continued)

OTHER PUBLICATIONS

International Search Report and Written Opinion for corresponding PCT Application Serial No. PCT/US2013/076585, dated May 15, 2014, 8 pgs.
(Continued)

*Primary Examiner* — Jennifer H Gay
(74) *Attorney, Agent, or Firm* — Kelly McKinney

(57) ABSTRACT

An element is deployed within tubing extending to a downhole tool. The downhole tool includes a hydraulic tool and a valve coupled between the conveyance string and the hydraulic tool. The valve includes a valve seat having a passage directing the fluid from the conveyance string to the hydraulic tool. Deploying the element includes landing the element on the valve seat such that the element substantially obstructs flow of the fluid through the valve seat passage. The valve is opened to direct the flow of the fluid around the hydraulic tool, wherein opening the valve utilizes pressure generated in response to the element obstructing the flow of the fluid through the valve seat passage. At least a portion of at least one of the element and the valve seat is then
(Continued)

degraded by an amount sufficient to permit the element to pass through the valve seat passage.

46 Claims, 11 Drawing Sheets

(51) Int. Cl.
*F16K 13/00* (2006.01)
*F16K 25/00* (2006.01)
*F16K 17/40* (2006.01)
*E21B 29/00* (2006.01)
*E21B 34/12* (2006.01)
*E21B 34/00* (2006.01)

(52) U.S. Cl.
CPC .............. *E21B 34/14* (2013.01); *F16K 13/04* (2013.01); *F16K 25/005* (2013.01); *E21B 2034/002* (2013.01); *E21B 2034/007* (2013.01)

(56) References Cited

U.S. PATENT DOCUMENTS

| | | | |
|---|---|---|---|
| 4,574,894 A | 3/1986 | Jadwin | |
| 4,889,199 A | 12/1989 | Lee | |
| 4,893,678 A | 1/1990 | Stokley et al. | |
| 5,332,045 A | 7/1994 | Ross et al. | |
| 5,392,862 A | 2/1995 | Swearingen | |
| 5,396,953 A | 3/1995 | Holder et al. | |
| 5,499,687 A | 3/1996 | Lee | |
| 5,695,009 A | 12/1997 | Hipp | |
| 5,730,222 A | 3/1998 | Rike, Jr. | |
| 5,941,311 A | 8/1999 | Newton | |
| 6,308,783 B2* | 10/2001 | Pringle ................. | E21B 17/028 166/240 |
| 7,322,417 B2 | 1/2008 | Rytlewski et al. | |
| 7,377,283 B2 | 5/2008 | Walker et al. | |
| 7,377,327 B2* | 5/2008 | Jackson ................. | E21B 34/10 166/325 |
| 7,640,991 B2 | 1/2010 | Leising | |
| 8,211,247 B2 | 7/2012 | Marya et al. | |
| 8,220,554 B2 | 7/2012 | Jordan et al. | |
| 8,231,947 B2 | 7/2012 | Vaidya et al. | |
| 8,469,109 B2* | 6/2013 | Wang ..................... | E21B 23/02 166/194 |
| 9,121,273 B2* | 9/2015 | Norrid .................... | E21B 34/14 |
| 9,316,090 B2* | 4/2016 | Walton .................. | E21B 34/063 |
| 2001/0022241 A1 | 9/2001 | Portman et al. | |
| 2002/0157837 A1* | 10/2002 | Bode ...................... | E21B 23/006 166/373 |
| 2006/0284134 A1 | 12/2006 | Dwivedi ................ | F16K 5/0428 251/208 |
| 2007/0044958 A1* | 3/2007 | Rytlewski ............... | C09K 8/68 166/250.01 |
| 2007/0062706 A1* | 3/2007 | Leising .................. | E21B 34/14 166/379 |
| 2009/0044944 A1* | 2/2009 | Murray .................. | E21B 43/02 166/308.1 |
| 2009/0308588 A1* | 12/2009 | Howell .................. | E21B 21/103 166/66.4 |
| 2010/0270034 A1 | 10/2010 | Clausen | |
| 2011/0132621 A1* | 6/2011 | Agrawal ................ | E21B 23/04 166/376 |
| 2011/0186306 A1* | 8/2011 | Marya .................... | E21B 33/12 166/386 |
| 2011/0284232 A1* | 11/2011 | Huang ................... | E21B 21/103 166/317 |
| 2011/0297393 A1* | 12/2011 | Patel ...................... | E21B 34/06 166/373 |
| 2012/0085548 A1* | 4/2012 | Fleckenstein ......... | E21B 34/063 166/373 |
| 2012/0097397 A1* | 4/2012 | Hofman ................. | E21B 43/12 166/308.1 |
| 2012/0205120 A1* | 8/2012 | Howell .................. | E21B 34/108 166/373 |
| 2012/0276356 A1* | 11/2012 | Xu ......................... | E21B 41/00 428/218 |
| 2012/0285692 A1* | 11/2012 | Potapenko ............. | E21B 21/003 166/308.1 |
| 2012/0318513 A1* | 12/2012 | Mazyar .................. | C25D 5/48 166/304 |
| 2012/0325480 A1* | 12/2012 | Schmidt ................. | E21B 10/32 166/298 |
| 2013/0000926 A1* | 1/2013 | Parrott ................... | E21B 43/26 166/386 |
| 2013/0032357 A1* | 2/2013 | Mazyar .................. | E21B 41/00 166/376 |
| 2013/0043041 A1* | 2/2013 | McCoy .................. | E21B 34/14 166/373 |
| 2013/0112435 A1* | 5/2013 | Fleming ................. | E21B 34/14 166/386 |
| 2013/0133897 A1* | 5/2013 | Baihly .................. | E21B 34/063 166/376 |
| 2013/0175033 A1* | 7/2013 | Baihly ................... | E21B 34/14 166/284 |
| 2013/0248201 A1* | 9/2013 | Jackson ................. | E21B 34/14 166/373 |
| 2013/0327540 A1* | 12/2013 | Hamid ................. | E21B 33/1208 166/376 |
| 2014/0151043 A1* | 6/2014 | Miller .................... | E21B 34/14 166/285 |
| 2014/0166912 A1* | 6/2014 | Larisey .................. | E21B 43/26 251/61 |
| 2014/0202708 A1* | 7/2014 | Jacob ..................... | E21B 23/01 166/376 |
| 2014/0246209 A1* | 9/2014 | Themig .................. | E21B 34/14 166/374 |
| 2014/0332233 A1* | 11/2014 | Walton .................. | E32B 34/063 166/376 |
| 2015/0247378 A1* | 9/2015 | Baihly ................... | E21B 23/04 166/298 |
| 2015/0369003 A1* | 12/2015 | Hajjari .................. | E21B 29/002 166/298 |
| 2016/0340995 A1* | 11/2016 | Walton .................. | E21B 34/063 |
| 2017/0002628 A1* | 1/2017 | Van Petegem ......... | E21B 34/14 |

FOREIGN PATENT DOCUMENTS

| | | |
|---|---|---|
| RU | 38829 U1 | 7/2004 |
| RU | 2244112 C1 | 1/2005 |
| RU | 2285179 C2 | 10/2006 |
| RU | 2314415 A | 1/2008 |
| WO | WO2012048144 A2 | 4/2012 |

OTHER PUBLICATIONS

The PBL Multiple Activation Jetting Tools, dated Sep. 23, 2011, 2 pages.

* cited by examiner

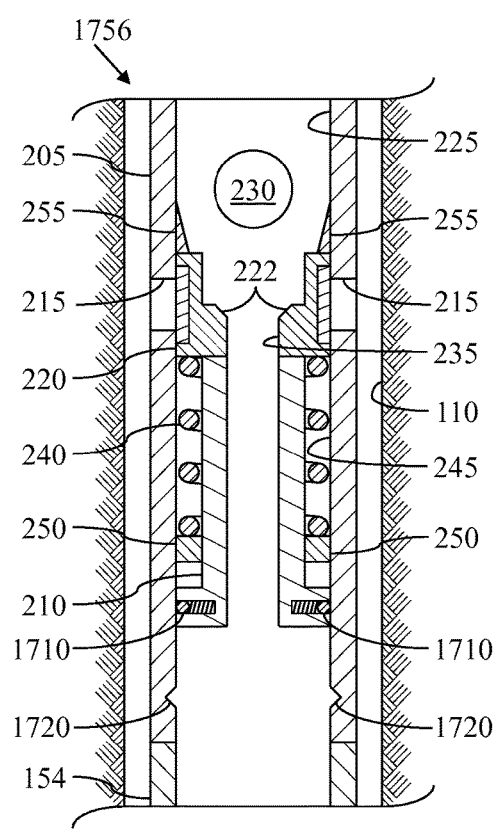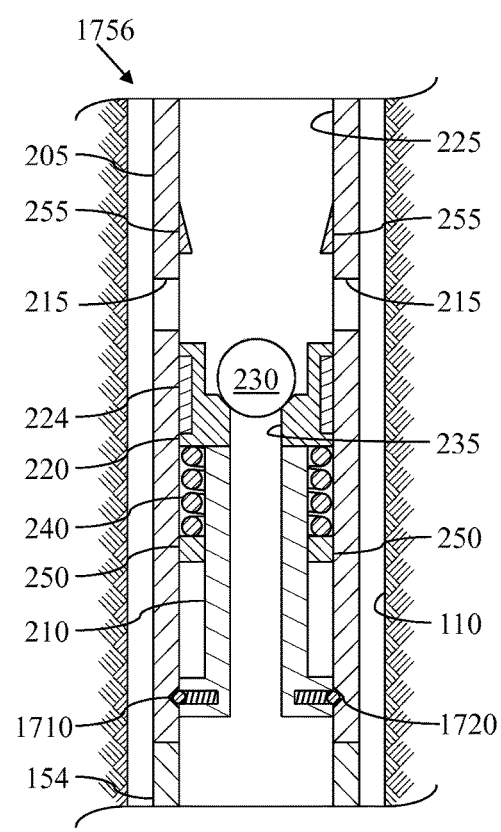
*FIG. 17*  *FIG. 18*

DOWNHOLE VALVE UTILIZING DEGRADABLE MATERIAL

BACKGROUND OF THE DISCLOSURE

The present disclosure is related in general to wellsite equipment such as oilfield surface equipment, downhole assemblies including, but not limited to, ball drop devices, coiled tubing surface equipment, and downhole tools and valves, among other apparatus and/or methods.

A multi-cycle circulation valve (MCCV) may be utilized in coiled tubing operations to provide high rate circulation function during operations such as milling operations where the maximum pump rate is limited by the pump rate specification of the motor in the toolstring. Exceeding the maximum allowable pump rate of the positive displacement motor (PDM) may damage the motor. However, high flow rate may be called for during a milling operation to lift debris and solid particles from the wellbore. An MCCV allows high rate circulation by providing two modes of operation, a circulation mode and a milling or other non-circulation mode.

For example, during a milling mode, fluid pumped from the surface is transferred into the mill and motor below the MCCV. When a downhole operation calls for a high rate of circulation, the MCCV is shifted to circulation mode, such that at least some of the fluid that is pumped from the surface bypasses the mill and the motor and enters into the annulus outside the coiled tubing. After the operation calling for the higher circulation rate has completed, the pump rate is reduced and the MCCV is shifted back to the milling mode.

SUMMARY OF THE DISCLOSURE

The present disclosure introduces an apparatus comprising a downhole tool operable for conveyance via tubing within a wellbore extending from a wellsite. The downhole tool includes a valve and a hydraulic tool driven by fluid pumped to the hydraulic tool via the tubing. The valve includes a valve seat having a passage directing the fluid from the tubing to the hydraulic tool. The valve also includes an element substantially preventing the fluid from flowing through the passage. At least a portion of at least one of the valve seat and the element is degradable.

The present disclosure also introduces deploying an element within a conveyance string extending to a downhole tool in a wellbore, wherein the downhole tool includes a valve and a hydraulic tool driven by fluid pumped to the hydraulic tool via the conveyance string. The valve is coupled between the conveyance string and the hydraulic tool, and includes a valve seat having a passage directing the fluid from the conveyance string to the hydraulic tool. The deployed element lands on the valve seat such that the element substantially obstructs flow of the fluid through the valve seat passage. The valve is opened to direct the flow of the fluid around the hydraulic tool. Opening the valve utilizes pressure generated in response to the element obstructing the flow of the fluid through the valve seat passage. At least a portion of at least one of the element and the valve seat is then degraded by an amount sufficient to permit the element to pass through the valve seat passage.

Additional aspects of the present disclosure are set forth in the description that follows, and/or may be learned by a person having ordinary skill in the art by reading the materials herein and/or practicing the principles described herein. At least some aspects of the present disclosure may be achieved via means recited in the attached claims.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

FIG. 17 is a sectional view of a portion of another implementation of the apparatus shown in FIG. 2 in an intermediate stage of operation according to one or more aspects of the present disclosure.

FIG. 18 is a sectional view of the apparatus shown in FIG. 17 in a subsequent stage of operation according to one or more aspects of the present disclosure.

DETAILED DESCRIPTION

Figure 1:
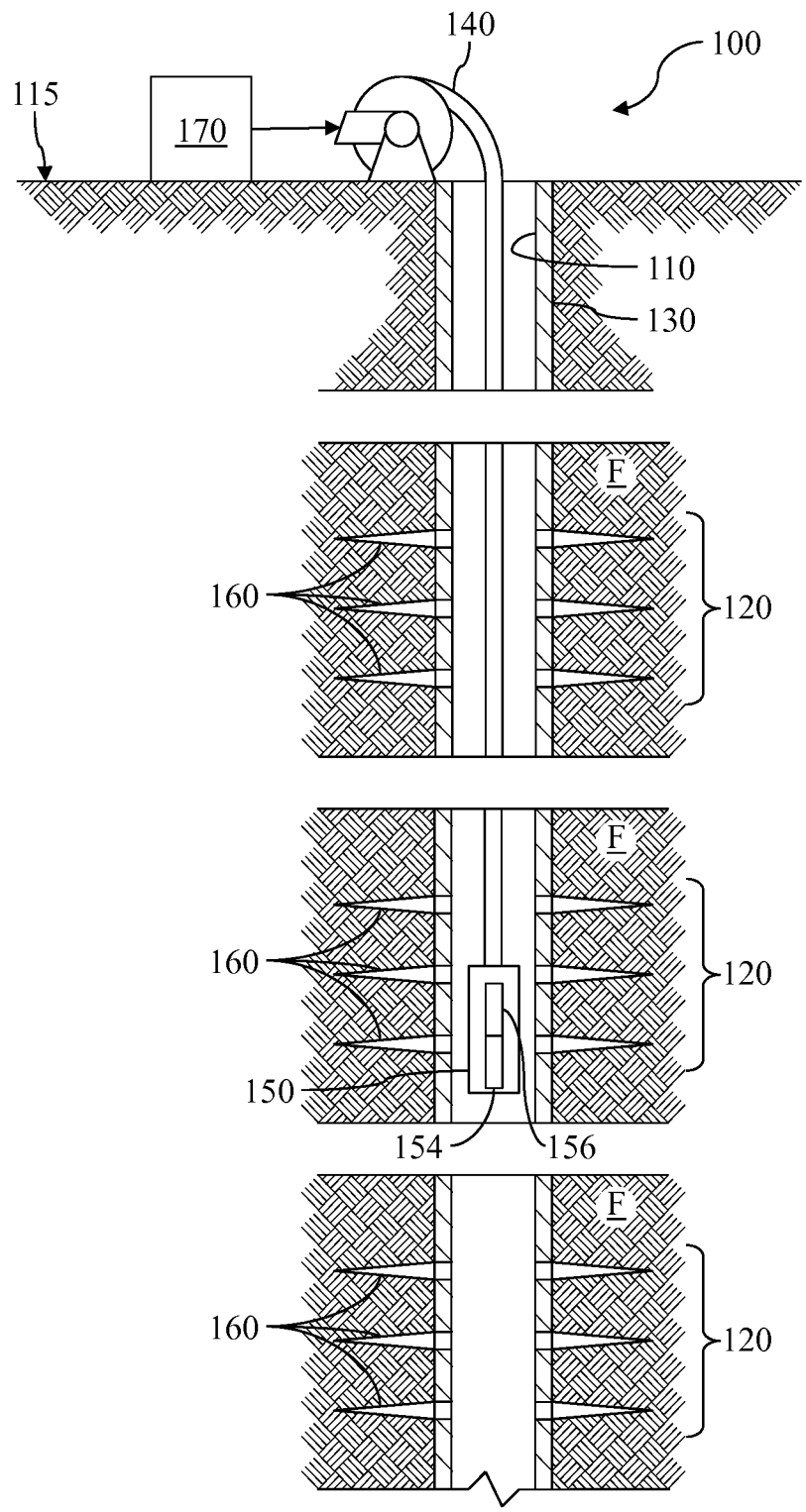
FIG. 1 is a schematic view of at least a portion of apparatus according to one or more aspects of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

FIG. 1 is a schematic view of at least a portion of a wellsite 100 according to one or more aspects of the present disclosure. The wellsite 100 comprises a wellbore 110 that intersects one or more subterranean formations F, perhaps through multiple zones of interest 120. At least a portion of the wellbore 110 may be cased and thus comprise a casing string 130, although one or more aspects of the present disclosure may be similarly applicable and/or readily adaptable for use with uncased or "open" or "open hole" wellbores. The casing string 130 may be cemented in the wellbore 110, such as by pumping cement into the annulus between the casing string 130 and the sidewalls of the wellbore 110. However, the casing string 130 may not be cemented, such as where the casing string 130 lines a lateral or other section of the wellbore 110. Thus, it is appreciated that the casing string 130 may be a liner, broadly considered herein as any form of casing, including that which may not extend to the surface 115, such as a specific interval length along a vertical, horizontal, and/or deviated wellbore.

A conveyance string 140 comprising and/or otherwise coupled to a bottom-hole assembly (BHA) 150 may extend downhole from the surface 115 of the wellsite 100 into the wellbore 110. The conveyance string 140 may be or comprise coiled tubing. However, one or more aspects of the present disclosure may be similarly applicable and/or readily adaptable for use with another type of string, such as a drillstring and/or other jointed tubing string, wired drill pipe, wireline, slickline, and/or others.

The wellsite 100 is depicted in FIG. 1 as being in a state in which fluid connectivity between the wellbore 110 and the zones 120 has been established, as depicted by perforations 160 that penetrate the casing string 130 and extend into the surrounding formation(s) F. Jetting subs and/or shaped-charge perforating guns, among other possible examples, may be utilized to perform perforation or otherwise form the perforations 160 of the zones 120.

The wellsite 100 may comprise a working fluid source 170 at the surface 115, such as may be utilized to hydraulically power a hydraulically operated tool 154 carried by and/or forming part of the BHA 150. The working fluid source 170 may supply, for example, hydraulic oil, slurry, and/or other fluids through a passageway of the conveyance string 140, such that the fluid may drive a rotational and/or other motive element of the tool 154. The BHA 150 also comprises a degradably-actuated, multi-cycle valve 156, which is operable to divert at least a portion of the working fluid received from the working fluid source 170 into the wellbore 110 while bypassing the tool 154, such as to clean fill out of the wellbore 110.

The present disclosure introduces a method comprising dropping and degrading a ball and/or seats associated with the valve 156, such as to allow an operator of the tool 154 and/or a related service to divert the working fluid received from the working fluid source 170 into the wellbore 110, thus bypassing the tool 154. The valve 156 may be subsequently returned to a milling and/or other non-circulation mode. The valve 156 may be repeatedly cycled in this manner, and may thus be or comprise an MCCV, be considered an MCCV, or at least be operable as an MCCV.

Figure 2:
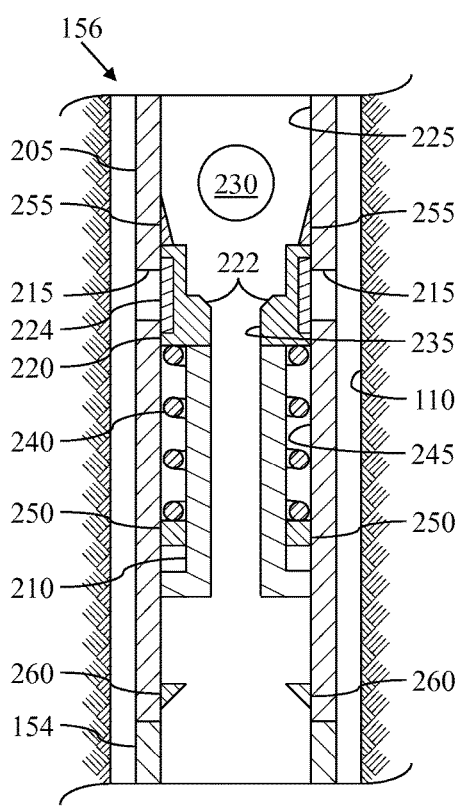
FIG. 2 is a sectional view of a portion of the apparatus shown in FIG. 1 in an intermediate stage of operation according to one or more aspects of the present disclosure.
Figure 3:
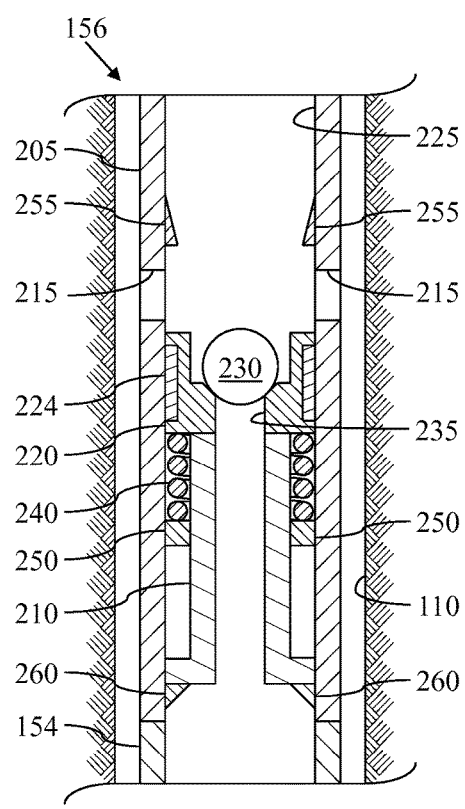
FIG. 3 is a sectional view of the apparatus shown in FIG. 2 in a subsequent stage of operation according to one or more aspects of the present disclosure.

FIGS. 2 and 3 depict at least a portion of the valve 156, among other components of the BHA 150. The valve 156 comprises a body 205 and a mandrel 210 disposed within the body 205. The body 205 includes one or more radial apertures 215, and the mandrel 210 comprises or is otherwise coupled to a valve seat 220. The mandrel 210 slides within the body 205 between an expanded first position (FIG. 2) and a compressed second position (FIG. 3). In the expanded first position (FIG. 2), the valve seat 220 prevents flow between an internal passage 225 of the valve 156 and the wellbore 110 by obstructing the one or more radial apertures 215. In the compressed second position (FIG. 3), the valve seat 220 is no longer blocking the one or more radial apertures 215, and thus permits flow between the internal passage 225 and the wellbore 110 through the one or more radial apertures 215.

Referring to FIGS. 1-3, collectively, the second position may be utilized during a circulation mode, such as for cleaning fill out of the wellbore 110, and the first position may be utilized during non-circulation and/or other modes, such as for milling through an obstacle in the wellbore 110 and/or other downhole operations. The lower end of the mandrel 210 (relative to the orientation shown in FIGS. 1-3) and/or a device coupled thereto may be or comprise the milling or other hydraulic tool 154 operably driven by working fluid received from the surface 115 via the conveyance string 140 and the internal passage 225.

The radial apertures 215 of the body 205 are substantially open when the valve 156 is in the first position, as shown in FIG. 3, thus establishing fluid communication between the internal passage 225 and the wellbore 110. As such, at least a portion of the working fluid received in the internal passage 225 from the surface 115 may bypass the hydraulic tool 154. For example, if the working fluid composition would be corrosive, excessively pressurized, and/or otherwise damaging to the hydraulic tool 154, some or all of the working fluid may bypass the hydraulic tool 154 via the flowpath created between the internal passage 225 and the wellbore 110 via substantial misalignment of the radial apertures 215 and the valve seal 220. Some or all of the working fluid may similarly bypass the hydraulic tool 154 in implementations in which the hydraulic tool 154 has a maximum operating hydraulic pressure rating that is less than the hydraulic pressure utilized during circulation and/or other downhole operations. When in the expanded configuration shown in FIG. 2, the valve 156 may direct the working fluid to the wellbore 110 through the hydraulic tool 154 instead of the bypass flowpath.

The valve 156 may also comprise a biasing member 240 operable to urge the mandrel 210 and/or valve seat 220 toward the expanded first position shown in FIG. 2. For example, the biasing member 240 may comprise one or more compression springs, servos, solenoids, pressurized chambers, and/or magnetic devices, among other biasing devices. The biasing member 240 may be contained within a sealed or unsealed chamber 245, such as may be defined by surfaces of one or more of the body 205, the mandrel 210, the valve seat 220, and other structural elements 250 that may be integral to or coupled with the body 205, the mandrel 210, and/or other components of the valve 156. The valve 156 may also comprise one or more uphole stops 255 that limit the uphole translation of the valve seat 220 caused by the biasing member 240. The one more uphole stops 255 may be integral to or coupled with to the body 205, the mandrel 210, and/or other components of the valve 156.

The valve 156 may be transitioned from the expanded first position shown in FIG. 2 to the compressed second position shown in FIG. 3 via utilization of a degradable element 230. The degradable element 230 is depicted in FIGS. 2 and 3 as substantially resembling or being a ball or other substantially spherical member, although other shapes are also within the scope of the present disclosure. The degradable element 230 may be introduced into the conveyance string 140 at the surface 115, such that hydraulic pressure created by one or more pumps and/or other components of the working fluid source 170 subsequently conveys the degradable element 230 downhole towards the valve 156. The degradable element 230 is initially larger in size than an internal passage 235 of the valve seat 220, such that continued exposure to the pressurized working fluid will urge the degradable element 230 against the valve seat 220, thus substantially blocking fluid flow through the internal passage 235.

After the degradable element 230 is landed on the valve seat 220, continued exposure to the pressurized working fluid will urge the mandrel 210 in a downhole direction relative to the body 205. That is, high pressure on the uphole side of the degradable element 230 will overcome the lower pressure on the downhole side, thus urging the mandrel 210 in a downhole direction. The collapsed length of the biasing member 240 may limit such downhole translation of the mandrel 210 relative to the body 205. However, the valve 156 may further comprise one or more downhole stops 260 that limit the downhole translation of the mandrel 210 caused by the pressure differential across the degradable element 230. The one more downhole stops 260 may be integral to or coupled with the body 205, the mandrel 210, and/or other components of the valve 156.

Figure 4:
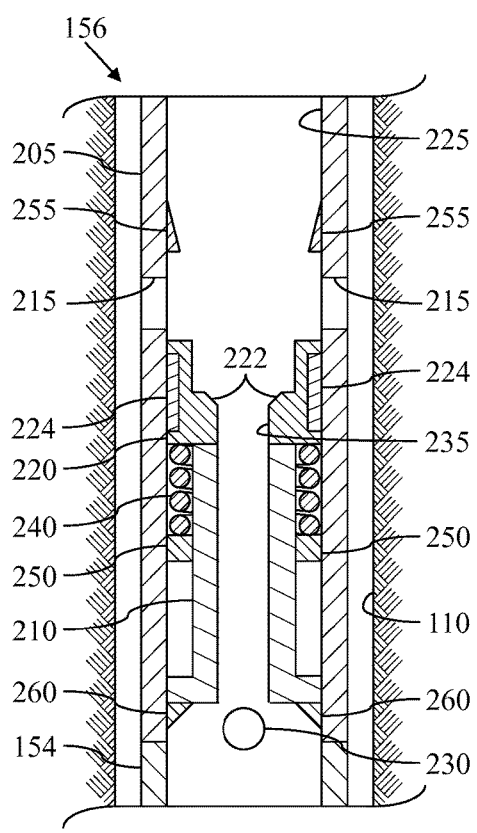
FIG. 4 is a sectional view of the apparatus shown in FIG. 3 in a subsequent stage of operation according to one or more aspects of the present disclosure.

As described above, the mandrel 210 will translate downhole relative to the body 205 in response to the pressure differential established across the degradable element 230 by the pressurized working fluid received from the surface 115. However, continued exposure to the pressurized working fluid will cause the degradation of the degradable element 230 after a predetermined or other period of time. Consequently, the degradable element 230 will eventually become small enough (or broken into a sufficient number of sufficiently smaller pieces) to be forced through the internal passage 235 of the valve seat 220 and the mandrel 210, as depicted in FIG. 4. After the degradable element 230 passes through the valve seat 220 (and perhaps also the rest of the mandrel 210), the hydraulic pressure on uphole and downhole sides of the valve 156 can once again equalize. Accordingly, the biasing member 240 will urge the valve seat 220 and the rest of the mandrel 210 back towards the expanded first position, as depicted in FIG. 5, thus once again obstructing fluid flow through the radial apertures 215 so that the working fluid received from the surface 115 is again directed substantially through the mandrel 210. Any remnants of the degradable element 230 may be carried back to the surface 115 by the uphole circulation of the working fluid in the annulus defined between the conveyance string 140 and the sidewalls of the wellbore 110. This process may then be repeated a number of times. For example, each iteration may include dropping or otherwise deploying another degradable element 230 downhole to the valve 156 to redirect the flow of working fluid through the radial apertures 215 until the degradable element 230 sufficiently reduces in size to pass through the valve seat 220.

The valve seat 220 may be a discrete component coupled directly or through one or more intervening components to the mandrel 210, or the valve seat 220 may be formed integral to the mandrel 210. A landing area 222 of the valve seat 220 on which the degradable element 230 lands may also be a discrete component coupled directly or through one or more intervening components to the valve seat 220 and/or the mandrel 210, or the landing area 222 may be formed integral to the valve seat 220 and/or the mandrel 210. One or more closure members 224 of the valve seat 220 that obstruct fluid flow through the radial apertures 215 may also be one or more discrete components coupled directly or through one or more intervening components to the valve seat 220 and/or the mandrel 210, or the one or more closure members 224 may be formed integral to the valve seat 220 and/or the mandrel 210. In some implementations, the landing area and the closure members 224 may be formed integral to the rest of the valve seat 220 as a single discrete member, which itself may be formed integral to the rest of the mandrel 210 as a single discrete member.

The degradable element 230 may be degradable in that it may be degraded or converted from one state to another with minimal intervention and/or in a controlled manner. For example, the degradable element 230 may be intended for a limited term use, after which it is degraded instead of being mechanically retrieved from the wellbore 110 (e.g., via time-consuming and costly "fishing" operations). Examples of the degradable material from which the degradable element 230 is made include water-dissolvable nylon and/or aluminum alloys, although additional examples are described below.

The degradable element 230 may undergo degradation in the form of dissolution, disintegration, and/or defragmentation. The degradable element 230 may also or instead undergo degradation in the form of shrinkage, such as may be caused by a reaction between the degradable element and an active fluid or fluid component in the working fluid pumped from the surface 115. Such shrinkage may, for example, entail the interaction between the degradable element 230 and the active fluid to produce a new material of smaller volume. Thus, shrinkage is not to be confused with dissolution or mass loss in the fluid. The shrinkage may also be in response to an electrical signal communicated to the degradable element 230 along the conveyance string 140 and/or the working fluid flowing therein, such as where the degradable element 230 comprises one or more materials whose properties can be altered by such an electrical signal. Example properties within the scope of the present disclosure include, without limitation, mechanical and/or rheological properties (such as shape, stiffness, and viscosity), or thermal, optical, or electromagnetic properties, among other properties that predictably and/or controllably respond to the electrical signal and/or other changes in their environment (e.g., temperature, pressure/stress, and composition). Example materials may include piezoelectric materials, electrostrictive materials, magnetostrictive materials, and shape-memory alloys, among others. Shape-memory alloys may be thermoresponsive alloys that can hold different shapes at various temperatures, magnetic shape memory alloys that change their shape in response to a substantial variation in the magnetic field, or pH-sensitive materials like polymers and/or other materials that collapse and/or otherwise shrink when the pH of the surrounding media changes.

The degradable element 230 may comprise degradable metals, alloys, and/or composites of metals and alloys that may include non-metallic materials, such as polymers, plastics, other organic materials, ceramics, and/or others. In addition to the ability to degrade under predetermined conditions, the material of the degradable element 230 may be selected from among relatively safe and reactive metals such as calcium, magnesium, and their alloys, as well as some less reactive metals like aluminum that may be made more reactive by alloying, processing, nanoscale structures, and/or inoculation. Where composite materials are employed, they may be partially metallic, plastic, and/or polymeric, among others.

The material of the degradable element 230 may also be selected based on pH-based degradation rates. For example, magnesium and/or a highly reactive aluminum alloy may be selected in some implementations because they degrade at low pH levels, whereas calcium may be selected in other implementations because it degrades in water regardless of pH.

The degradable element 230 may also comprise a semi-permeable coating selected to retard degradation and/or otherwise aid in selection of the period of time during which the valve 156 is maintained in the compressed second position shown in FIG. 3. Such semi-permeable materials may be non-metallic, such as a porous or foamed rubber or plastic, among other examples.

The degradable element 230 may also comprise a substantially impermeable layer that may be removed to commence degradation. For example, the substantially impermeable layer and the underlying degradable materials may be reactive to different activation fluids. Thus, a first activation fluid may not be pumped downhole until it is time for degradation to commence. At that time, the first activation fluid may be pumped downhole for a sufficient period to compromise the substantially impermeable layer. Thereafter, a second activation fluid may be pumped downhole to achieve degradation that is sufficient to force the degradable element past the valve seat 220 and/or the mandrel 210. Accordingly, an initial working fluid may be pumped downhole for various operations, and such working fluid may comprise the second activation fluid, yet degradation may be delayed until the first activation fluid is pumped downhole to commence degradation. Such implementations may be utilized when, for example, the second activation fluid is or comprises the working fluid and/or a material commonly utilized for the various downhole operations, such as water, fluids containing water, and some drilling fluids.

The degradable element 230 may also be utilized to provide multiple actuations. For example, the composite components of the degradable element 230 may be designed to be utilized as many times as there are layers of degradable materials, or as many times as there are alternating pairs of substantially impermeable layers and degradable layers. Moreover, each successively smaller diameter of each layer may permit a single degradable element 230 to be utilized with multiple valve seats 220 each having a successively smaller landing area 222.

Degradation of the degradable element 230 may be started by contact with selected active fluids, temperatures, and/or pressures. The active fluids that can be used to degrade the smart degradable materials may be solvents to the particular materials. The active fluids may be liquid, gas, or multi-phase. Liquid active fluids may comprise water and/or one or more acids. Gaseous active fluids may comprise water vapor and/or one or more acid vapors. Multi-phase active fluids may comprise water, one or more acids or brines (such as chlorides) dissolved in water, and/or one or more dissolved gases (such as carbon dioxide or hydrogen sulfide) that may contribute to enhancing acidity of the active fluid and, therefore, increase degradation.

Figure 5:
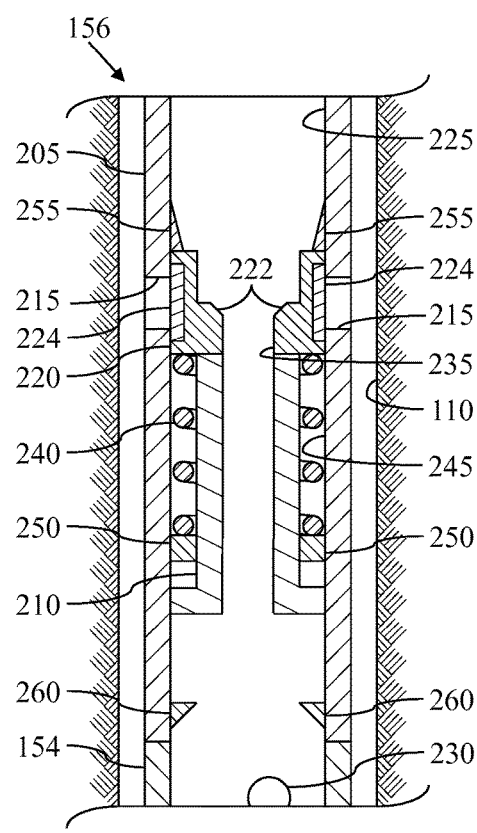
FIG. 5 is a sectional view of the apparatus shown in FIG. 4 in a subsequent stage of operation according to one or more aspects of the present disclosure.
Figure 6:
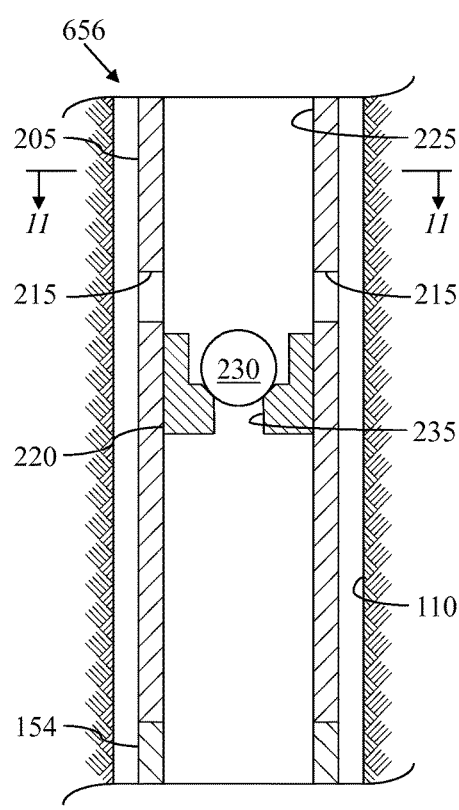
FIG. 6 is a sectional view of a portion of another implementation of the apparatus shown in FIG. 2 in an intermediate stage of operation according to one or more aspects of the present disclosure.

FIG. 6 is a schematic view of another implementation of the valve 156 shown in FIGS. 2-5, herein designated by reference numeral 656. The valve 656 may be substantially similar to the valve 156 shown in FIGS. 2-5 with the following possible exceptions.

For example, the valve 156 shown in FIG. 6 does not include the mandrel 210, the biasing member 240, the additional structural elements 250, the one or more stops 255, or the one or more stops 260. Nonetheless, operations involving the valve 656 are similar to operations involving the valve 156. That is, the degradable element 230 is dropped downhole and lands on the valve seat 220. However, the resulting pressure differential across the degradable element 230 does not cause the repositioning of any components. Instead, the existence of the degradable element 230 prevents fluid flow through the valve seat 220, thus forcing the fluid flow through the radial apertures 215.

Figure 7:
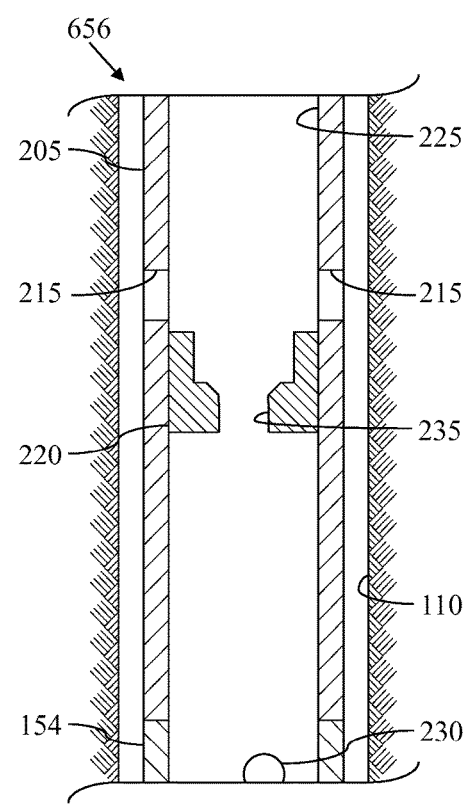
FIG. 7 is a sectional view of a portion of the apparatus shown in FIG. 6 in a subsequent stage of operation according to one or more aspects of the present disclosure.

After a period of time, the degradable element 230 degrades sufficiently to be forced through the internal passage 235 of the valve seat 220, as depicted in FIG. 7, thus restoring fluid flow through the valve seat 220. However, a portion of the working fluid may still flow through the radial apertures 215. Nonetheless, the implementation depicted in FIGS. 6 and 7 may otherwise be substantially similar to those described above with respect to FIGS. 2-5, including with respect to composition of the degradable element 230, multi-cycle utilization thereof, and/or other factors.

Figure 8:
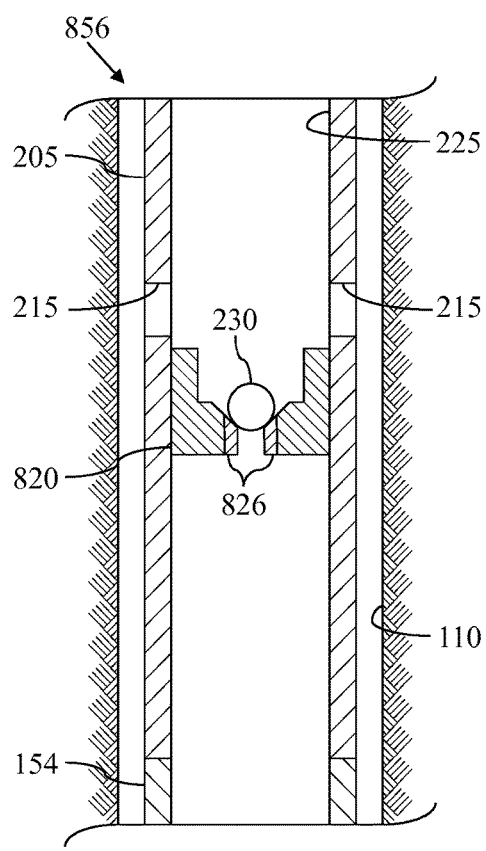
FIG. 8 is a sectional view of a portion of another implementation of the apparatus shown in FIG. 6 in an intermediate stage of operation according to one or more aspects of the present disclosure.

FIG. 8 is a schematic view of another implementation of the valve 656 shown in FIGS. 6 and 7, herein designated by reference numeral 856. The valve 856 may be substantially similar to the valve 656 with the following possible exceptions.

For example, the valve 856 comprises a valve seat 820 that is substantially similar to the valve seat 220 described above, except that the valve seat 820 shown in FIG. 8 comprises a degradable portion 826. The degradable portion 826 may comprise a degradable material similar to one or more of those described above. After sufficient degradation of the degradable portion 826 and the degradable element 230, the degradable element 230 will pass through the resulting interior passage. The degradable element 230 may also be replaced by a non-degradable element, such that the valve 856 may open in response to sufficient degradation of the degradable portion 826 of the valve seat 820 without the additional degradation of other components.

Figure 9:
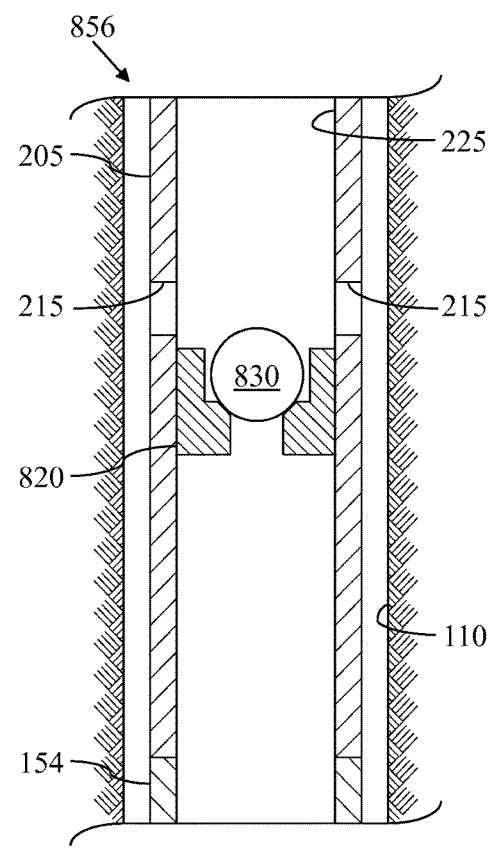
FIG. 9 is a sectional view of a portion of the apparatus shown in FIG. 8 in a subsequent stage of operation according to one or more aspects of the present disclosure.

Moreover, after the degradable portion 826 degrades an amount sufficient for the valve 856 to reopen, another element 830 may be pumped downhole to the valve 856 for an additional iteration of the process, as depicted in FIG. 9. The additional element 830 may be larger in diameter and/or other dimension relative to the degradable element 230 shown in FIG. 8, such that the remaining portion of the valve seat 820 may prevent the passage of the additional element 830. The larger element 830 may be degradable, such as in a manner similar to the degradable element 230 described above, or the valve seat 820 may comprise another degradable portion (not shown), or both the element 830 and a portion of the valve seat 820 may be degradable.

This process may be repeated a number of times, with each iteration utilizing a larger element 830 and/or internal passage of the valve seat 820. Each of the iterations, alternating ones of the iterations, and/or some other number of the iterations may utilize an element 830 that is degradable, a degradable portion of the valve seat 820, or both.

Figure 10:
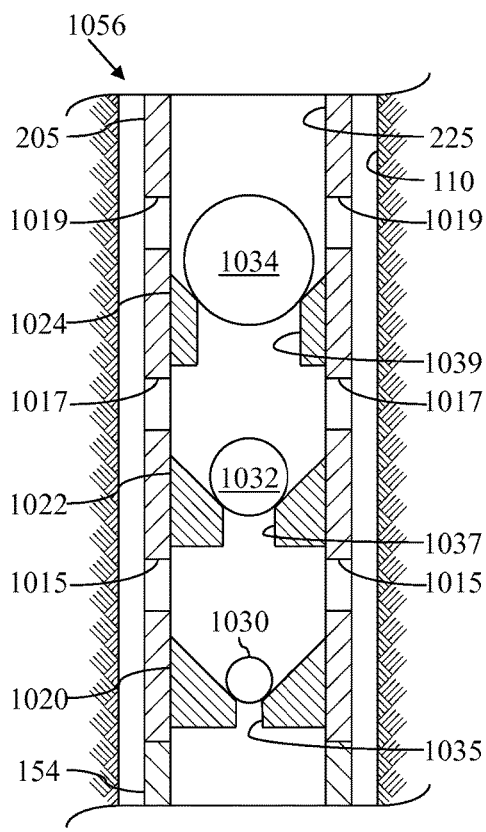
FIG. 10 is a sectional view of a portion of another implementation of the apparatus shown in FIG. 6 according to one or more aspects of the present disclosure.

FIG. 10 is a schematic view of another implementation of the valve 656 shown in FIGS. 6 and 7, herein designated by reference numeral 1056. The valve 1056 may be substantially similar to the valve 656 with the following possible exceptions.

For example, instead of the single valve seat 220 shown in FIG. 6, the valve 1056 shown in FIG. 10 comprises a first valve seat 1020, a second valve seat 1022, and a third valve seat 1024. The first valve seat 1020 includes an internal passage 1035 having an inside diameter that is smaller than the diameter of a first element 1030. The second valve seat 1022 includes an internal passage 1037 having an inside diameter that is smaller than the diameter of a second element 1032 but larger than the inside diameter of the internal passage 1035 of the first valve seat 1020. The third valve seat 1024 includes an internal passage 1039 having an inside diameter that is smaller than the diameter of a third element 1034 but larger than the inside diameter of the internal passage 1037 of the second valve seat 1022. The third element 1034 is larger in diameter than the second element 1032, which is larger in diameter than the first element 1030.

In operation, the first element 1030 may be pumped downhole first. The first element 1030 is smaller in diameter than, and will thus pass through, the internal passage 1039 of the third valve seat 1024. The first element 1030 is also smaller in diameter than, and will thus pass through, the internal passage 1037 of the second valve seat 1022. However, the first element 1030 is initially larger in diameter than the internal passage 1035 of the first valve seat 1020, and will thus land on the first valve seat 1020. Consequently, fluid flow from the surface will be substantially prevented from passing through the internal passage 1035 of the first valve seat 1020, and will accordingly exit first radial apertures 1015 that are axially positioned between the first valve seat 1020 and the second valve seat 1022, second radial apertures 1017 that are axially positioned between the second valve seat 1022 and the third valve seat 1024, and third radial apertures 1019 that are axially positioned uphole of the third valve seat 1024. However, the first element 1030 and/or at least a portion of the first valve seat 1020 are/is degradable. Thus, after a period of time, the first element 1030 and/or at least a portion of the first valve seat 1020 will sufficiently degrade so as to open the first valve seat 1020, thus once again permitting fluid flow through the valve 1056.

Thereafter, the second element 1032 may be pumped downhole. The second element 1032 is smaller in diameter than, and will thus pass through, the internal passage 1039 of the third valve seat 1024. However, the second element 1032 is initially larger in diameter than the internal passage 1037 of the second valve seat 1022, and will thus land on the second valve seat 1022. Consequently, fluid flow from the surface will be substantially prevented from passing through the internal passage 1037 of the second valve seat 1022, and will accordingly exit the second radial apertures 1017 and the third radial apertures 1019. However, the second element 1032 and/or at least a portion of the second valve seat 1022 are/is degradable. Thus, after a period of time, the second element 1032 and/or at least a portion of the second valve seat 1022 will sufficiently degrade so as to open the second valve seat 1022, thus once again permitting fluid flow through the valve 1056.

Thereafter, the third element 1034 may be pumped downhole. The third element 1034 is initially larger in diameter than the internal passage 1039 of the third valve seat 1024, and will thus land on the third valve seat 1024. Consequently, fluid flow from the surface will be substantially prevented from passing through the internal passage 1039 of the third valve seat 1024, and will accordingly exit the third radial apertures 1019. However, the third element 1034 and/or at least a portion of the third valve seat 1024 are/is degradable. Thus, after a period of time, the third element 1034 and/or at least a portion of the third valve seat 1024 will sufficiently degrade so as to open the third valve seat 1024, thus once again permitting fluid flow through the valve 1056.

Accordingly, implementations within the scope of the present disclosure may include those in which different sized elements (e.g., 1030, 1032, 1034) and/or different sized valve seats (e.g., 1020, 1022, 1024) may be utilized to vary the collective cross-sectional area of radial apertures (e.g., 1015, 1017, 1019) through which fluid flow may exit the valve 1056 while bypassing the hydraulic tool 154. Moreover, the size and/or shape of the radial apertures may be varied, thus providing yet another level of customization.

The order in which the first element 1030, the second element 1032, and the third element 1034 are utilized, as well as the number of such elements that are utilized, may also vary within the scope of the present disclosure. For example, the third element 1034 may be utilized first, thus permitting fluid flow from the interior passage 225 of the valve 1056 to the wellbore 110 through the third radial apertures 1019 but not through the second radial apertures 1017 or the first radial apertures 1015. After sufficient degradation of the third element 1034 and/or at least a portion of the third valve seat 1024, the third element 1034 may pass through the third valve seat 1024 and land on the second valve seat 1022, thus permitting fluid flow from the interior passage 225 of the valve 1056 to the wellbore 110 through the third radial apertures 1019 and the second radial apertures 1017 but not through the first radial apertures 1015. Similarly, after sufficient degradation of the third element 1034 and/or at least a portion of the second valve seat 1022, the third element 1034 may pass through the second valve seat 1022 and land on the first valve seat 1020, thus permitting fluid flow from the interior passage 225 of the valve 1056 to the wellbore 110 through the third radial apertures 1019, the second radial apertures 1017, and the first radial apertures 1015. Thereafter, sufficient degradation of the third element 1034 and/or at least a portion of the first valve seat 1020 will permit the third element 1034 to pass through the first valve seat 1020, thus permitting fluid flow from the interior passage 225 of the valve 1056 to the hydraulic tool 154.

Figure 11:
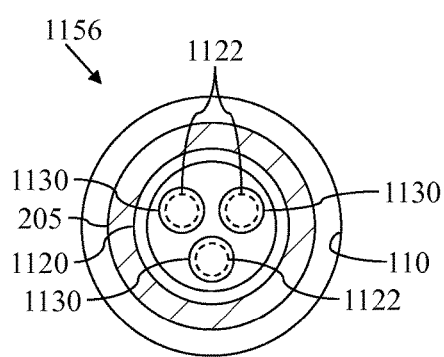
FIG. 11 is a sectional view of a portion of another implementation of the apparatus shown in FIG. 6 according to one or more aspects of the present disclosure.

FIG. 11 is a sectional view of another implementation of the valve 656 shown in FIGS. 6 and 7, herein designated by reference numeral 1156. The valve 1156 may be substantially similar to the valve 656 shown in FIGS. 6 and 7 with the following possible exceptions.

For example, the valve 1156 includes a valve seat 1120 that accommodates up to three degradable elements 1130, each of which may be substantially similar to the degradable element 230 described above. Each degradable element 1130 may land on a corresponding landing area 1122 of the valve seat 1120.

The degradable elements 1130 may be utilized in various manners within the scope of the present disclosure. For example, each degradable element 1130 may be deployed and utilized individually or in groups of two or more. The degradable elements 1130 may have different sizes and/or rates of degradation, thus providing the ability to further customize the percentage of fluid flow bypassing the hydraulic tool 154 with respect to time. Related implementations may utilize a valve seat 1120 that is at least partially degradable, including implementations in which the valve seat 1120 includes two or more regions of varying size and/or degradation rates. Such implementations may utilize the degradable elements 1130, non-degradable substitutes for the degradable elements 1130, or combinations thereof.

An example operation utilizing the valve 1156 may entail pumping one of the degradable elements 1130 (or a non-degradable substitute therefor) downhole to land on one of the landing areas 1122 and thereby reduce the amount of fluid flow permitted past the valve seat 1120. A second degradable element 1130 (or a non-degradable substitute therefor) may then be pumped downhole to land on another one of the landing areas 1122, thereby further reducing the amount of fluid permitted past the valve seat 1120. A third degradable element 1130 (or a non-degradable substitute therefor) may then be pumped downhole to land on the final remaining landing area 1122, such that the fluid flow is substantially directed through the radial apertures 215 into the wellbore 110.

Figure 12:
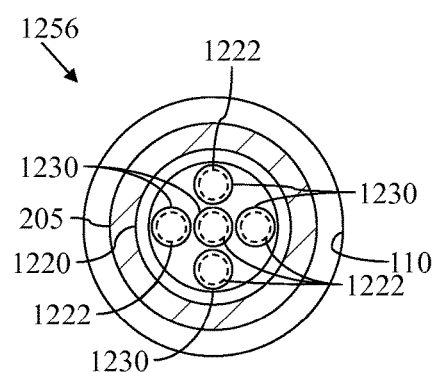
FIG. 12 is a sectional view of a portion of another implementation of the apparatus shown in FIG. 6 according to one or more aspects of the present disclosure.

FIG. 12 is a sectional view of another implementation of the valve 1156 shown in FIG. 11, herein designated by reference numeral 1256. The valve 1256 may be substantially similar to the valve 1156 shown in FIG. 11 except that the valve 1256 includes a valve seat 1220 that accommodates up to five degradable elements 1230, each of which may be substantially similar to the degradable elements 1130 described above. Each degradable element 1230 may land on a corresponding landing area 1222 of the valve seat 1220.

The degradable elements 1230 may be utilized in various manners similar to the above-described utilization of the degradable elements 1130. For example, each degradable element 1230 may be deployed and utilized individually or in groups of two or more. The degradable elements 1230 may have different sizes and/or rates of degradation, thus providing the ability to further customize the percentage of fluid flow bypassing the hydraulic tool 154 with respect to time. Related implementations may utilize a valve seat 1220 that is at least partially degradable, including implementations in which the valve seat 1220 includes two or more regions of varying degradation rates and/or sizes. Such implementations may utilize the degradable elements 1230, non-degradable substitutes for the degradable elements 1230, or combinations thereof.

Figure 13:
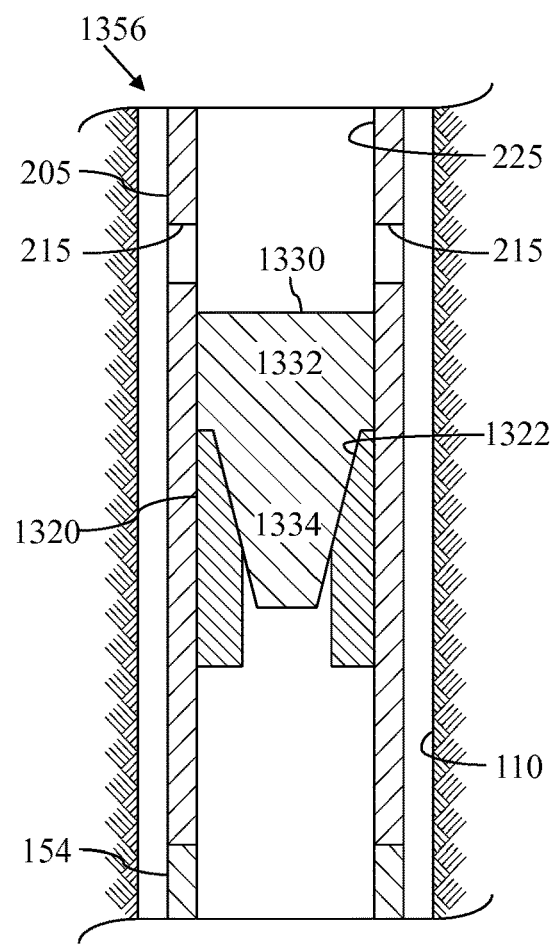
FIG. 13 is a sectional view of a portion of another implementation of the apparatus shown in FIG. 6 according to one or more aspects of the present disclosure.

FIG. 13 is a schematic view of another implementation of the valve 656 shown in FIGS. 6 and 7, herein designated by reference numeral 1356. The valve 1356 may be substantially similar to the valve 656 except that the degradable element 1330 is not substantially spherical. That is, the degradable element 1330 has a first section 1332 that is substantially cylindrical and a second section 1334 that is substantially conical. The valve seat 1320 of the valve 1356 may also differ relative to the valve seat 620 shown in FIG. 6, such as to provide a landing area 1322 that is also substantially conical or otherwise geometrically corresponding to at least a portion of the degradable element 1330. However, the valve 1356 may comprise the valve seat 620 shown in FIG. 6, among others within the scope of the present disclosure.

Figure 14:
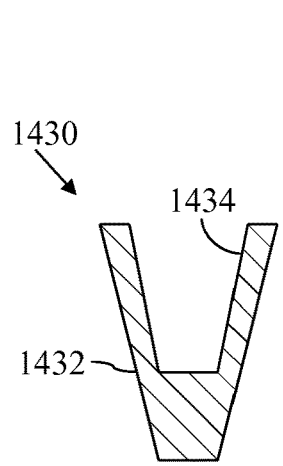
FIG. 14 is a sectional view of a portion of another implementation of the apparatus shown in FIG. 13 according to one or more aspects of the present disclosure.

FIG. 14 is a sectional view of another implementation of the degradable element 1330 shown in FIG. 13, herein designated by reference numeral 1430. The degradable element 1430 has an exterior profile 1432 that is substantially conical. The degradable element 1430 may also include an uphole-facing recess 1434, which may have a cross-sectional profile having one or more portions that are each partially or substantially conical, cylindrical, or otherwise shaped.

Figure 15:
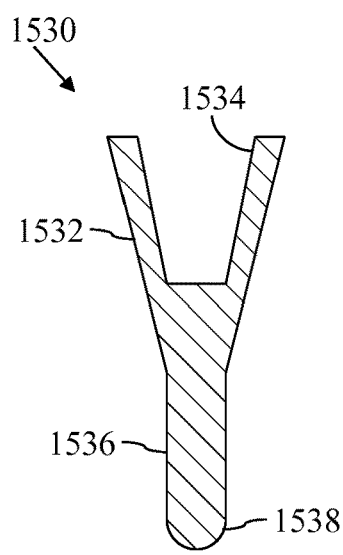
FIG. 15 is a sectional view of a portion of another implementation of the apparatus shown in FIG. 13 according to one or more aspects of the present disclosure.

FIG. 15 is a sectional view of another implementation of the degradable element 1430 shown in FIG. 14, herein designated by reference numeral 1530. An uphole portion 1532 of the degradable element 1530 has an exterior profile that is substantially conical. The uphole portion 1532 may also include an uphole-facing recess 1534, which may have a cross-sectional profile having one or more portions that are each partially or substantially conical, cylindrical, or otherwise shaped. A downhole portion 1536 of the degradable element 1530 may be substantially cylindrical. A downhole end 1538 of the downhole portion 1536 may be substantially spherical and/or otherwise at least partially rounded.

Figure 16:
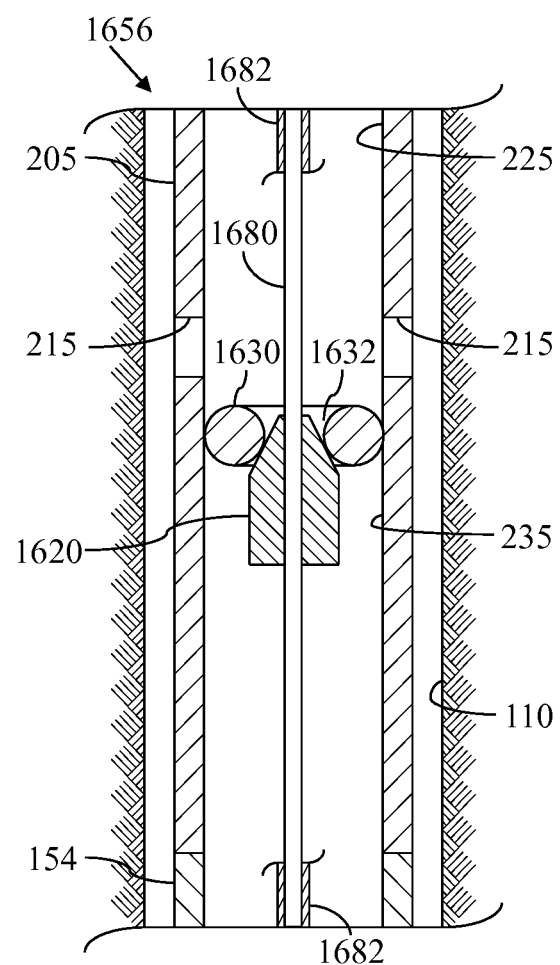
FIG. 16 is a sectional view of a portion of another implementation of the apparatus shown in FIG. 6 according to one or more aspects of the present disclosure.

FIG. 16 is a sectional view of another implementation of the valve 656 shown in FIGS. 6 and 7, herein designated by reference numeral 1656. The valve 1656 may be substantially similar to the valve 656 shown in FIGS. 6 and 7 with the following possible exceptions.

For example, the valve 1656 includes a valve seat 1620 disposed in a central portion of the central passage 225, and is utilized with a donut- or otherwise annulus-shaped degradable element 1630. Accordingly, one or more electric, fiber-optic, hydraulic, and/or other control lines 1680 may pass through the degradable element 1630. The control lines 1680, or a downhole tool, tubing, and/or other structure 1682 containing the control lines 1680, may be inserted through the central opening 1632 of the degradable element 1630 at the surface 115 (FIG. 1) prior to pumping the degradable element 1630 downhole to the valve 1656. In implementations utilizing the structure 1682 (e.g., so that the control lines 1630 are not exposed to the fluids within the central passage 225), a portion of the structure 1682 may also extend through the centralized valve seat 1620. Such portion is not shown in FIG. 16, although such exclusion is merely to increase clarity and understanding of FIG. 16.

One or more aspects of the implementations described above and/or shown in one or more of FIGS. 6-16 may also be utilized in the implementation shown in FIGS. 2-5. For example, the valve seat 220 shown in FIGS. 2-5 may be at least partially degradable instead of or in addition to the degradable element 230. The mandrel 210 may comprise multiple valve seats and/or be utilized with multiple degradable elements. In implementations in which multiple valve seats 220 are utilized, the valve seats may be substantially the same relative to one another, or they may differ in size, shape, and/or rate of degradation. In implementations in which multiple degradable elements 230 are utilized, the degradable elements may be substantially the same relative to one another, or they may differ in size, shape, and/or rate of degradation. One or more control lines may also pass through or around the valve seat. The example implementations depicted in FIGS. 6-16 may also include one or more of the mandrel 210, biasing member 240, and/or other components and/or features depicted in FIGS. 2-5.

FIGS. 17 and 18 are sectional views of another implementation of the valve 156 shown in FIGS. 2 and 3, herein designated by reference numeral 1756. The valve 1756 may be substantially similar to one or more of the other valves described herein, but with the addition of detent mechanism operable to assist in maintaining the mandrel 210 in the compressed position (FIG. 18) while the degradable element 230 undergoes degradation.

For example, the detent mechanism may comprise a ball-detent device 1710 carried by the mandrel 210 and operable to engage one or more corresponding recesses 1720 in the internal profile of the body 205. The body 205 may instead contain the ball-detent device 1710, and the one or more corresponding recesses 1720 may be disposed in a corresponding surface of the mandrel 210. Both options may also be utilized, such that the body 205 and the mandrel 210 may each contain an instance of the ball-detent device 1710 operable to engage corresponding recesses 1720 of the mandrel 210 and the body 205, respectively. However, the biasing member 240 may still be operable to overcome the detent force and return the mandrel 210 to the expanded position (FIG. 17).

Figure 19:
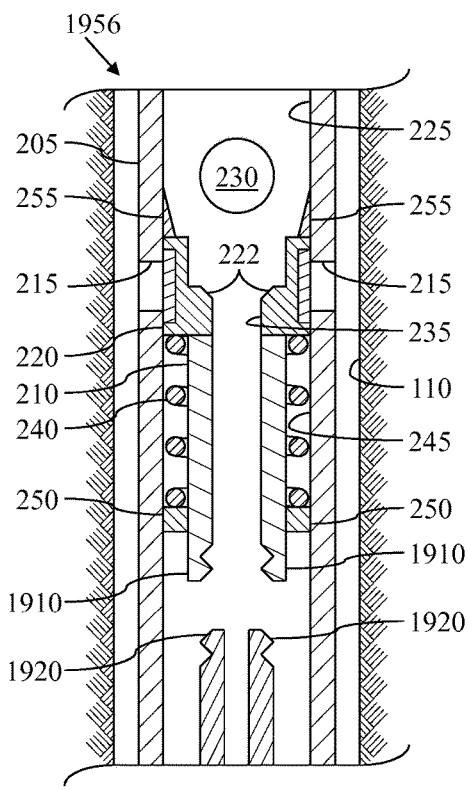
FIG. 19 is a sectional view of a portion of another implementation of the apparatus shown in FIG. 2 in an intermediate stage of operation according to one or more aspects of the present disclosure.
Figure 20:
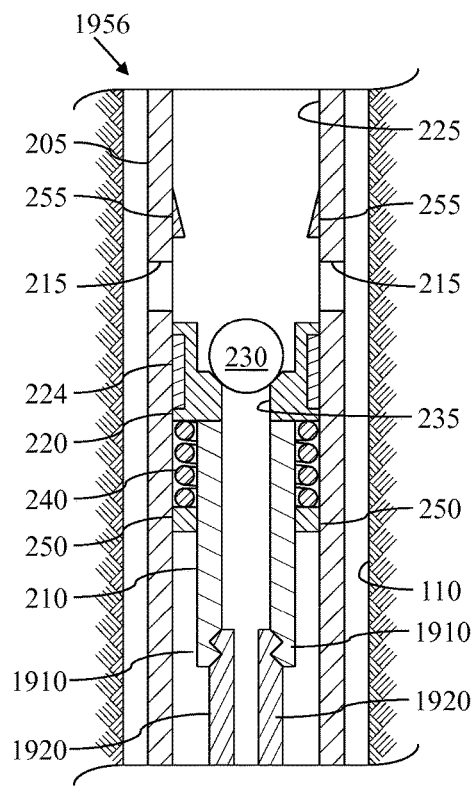
FIG. 20 is a sectional view of the apparatus shown in FIG. 19 in a subsequent stage of operation according to one or more aspects of the present disclosure.

FIGS. 19 and 20 are sectional views of another implementation of the valve 1756 shown in FIGS. 17 and 18, herein designated by reference numeral 1956. The valve 1956 may be substantially similar to the valve 1756, but instead of the detent mechanism, the valve 1956 comprises a collet arrangement operable to assist in maintaining the mandrel 210 in the compressed position (FIG. 20) while the degradable element 230 undergoes degradation.

For example, the collet arrangement may comprise flexible fingers 1910 carried by or otherwise positionally fixed relative to the body 205. The flexible fingers 1910 are operable to deflect radially (whether inward, as in depiction of FIGS. 19 and 20, or outward) in response to the relative downhole translation of the mandrel 210, and ultimately engage corresponding notches and/or recesses 1720 of the mandrel 210. However, the flexible fingers 1910 may be carried by or otherwise be positionally fixed relative to the mandrel 210 and be operable to engage corresponding notches and/or recesses of the body 205. In a related implementation, the engagement is between two cooperating collets, each having a set of flexible fingers that deflect radially and engage one another. Nonetheless, the biasing member 240 may still be operable to overcome the engagement force and return the mandrel 210 to the expanded position (FIG. 19).

Figure 21:
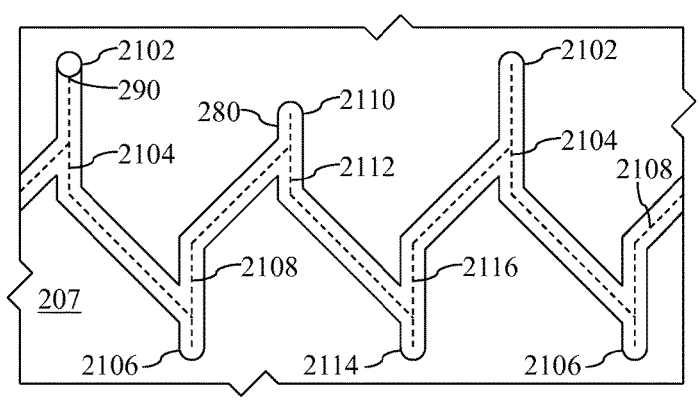
FIG. 21 is a schematic view of a portion of another implementation of the apparatus shown in FIG. 2 according to one or more aspects of the present disclosure.

The axial position of the mandrel 210 may also be maintained after each repositioning by the engagement of one or more indexing members within an indexing track. For example, FIG. 21 is an "unrolled" view of a portion of an interior surface 207 of the body 205 (such as that surface which defines the internal passage 225) in which an indexing track 280 is recessed. The interior surface 207 may be that of a component of the body 205, such as a ring or annulus shaped element that may rotate relative to the body 205. One or more indexing members 290 extending from the mandrel 210 may travel within the indexing track 280 during repositioning of the mandrel 210. In related implementations, the mandrel 210 and/or a component thereof may comprise the indexing track 280, and the one or more indexing members 290 may extend from the body 205 and/or a component thereof.

Returning to FIG. 21, and with continued reference to FIGS. 2-5, collectively, the indexing member 290 may be seated in a first static position 2102 of the indexing track 280 when the mandrel 210 is in the fully expanded position and fluid flow from the surface is substantially prevented from flowing through the radial apertures 215, as shown in FIG. 2. As the degradable member 230 is pumped downhole and lands on the mandrel 210, and the resulting change in pressure across the valve 156 translates the mandrel 210 downhole relative to the body 205, the indexing member 290 may travel along a path 2104 of the indexing track 280 towards an intermediate position 2106, which may correspond to the mandrel 210 being in the position shown in FIGS. 3 and 4.

As illustrated in FIG. 21, such travel along the path 2104 may entail relative rotation of the body 205 and mandrel 210 and/or components thereof. That is, the rotation may entail rotation of the body 205 relative to the mandrel 210, rotation of the mandrel 210 relative to the body 205, rotation of a rotatable portion of the body 205 relative to the body 205 and/or the mandrel 210, and/or rotation of a rotatable portion of the mandrel 210 relative to the mandrel 210 and/or the body 205.

The subsequent degradation of the degradable element 230, perhaps in conjunction with the biasing force of the biasing member 240, may then cause the mandrel 210 to translate uphole, resulting in the indexing member 290 traveling along a path 2108 of the indexing track 280 to a second static position 2110. The second static position 2110 may correspond to the mandrel 210 returning to the position shown in FIGS. 2 and 5 or, as depicted in FIG. 21, to an intermediate position in which one or more of the radial apertures 215 are partially blocked. In implementations in which the valve 156 comprises radial apertures 215 at multiple axial positions (such as in FIG. 10), the intermediate position may substantially block the radial apertures 215 below a certain axial position but not the radial apertures 215 above that axial position.

The valve 156 may be subsequently actuated by another change in the pressure resulting from the introduction of an additional degradable element 230, causing the indexing member 290 to travel along a path 2112 of the indexing track 280 towards another intermediate position 2114, which may correspond to the mandrel 210 again being in the position shown in FIGS. 3 and 4. The subsequent degradation of the degradable element 230, perhaps in conjunction with the biasing force of the biasing member 240, may then cause the mandrel 210 to again translate uphole, resulting in the indexing member 290 to traveling along a path 2116 of the indexing track 280 to another instance of the static position 2102, again corresponding to the mandrel 210 being positioned as shown in FIGS. 2 and 5.

The process may then be repeated for each instance that one or more of the radial apertures 215, including at different axial positions, may be temporarily opened while one or more degradable elements and/or valve seat elements are being degraded. That is, in the example implementation described above and shown in FIG. 21, there are two static positions for the mandrel 210, where the first static position may correspond to all of the radial apertures 215 being open and the second static position may correspond to a portion of the radial apertures 215 being open. However, if there are radial apertures 215 are more than two axial positions, the indexing track 280 may include more than two static positions.

Also, the indexing member 290 may be maintained in the intermediate positions 2106 and 2114 by the pressure resulting from the flow of fluid pumped from the surface. However, one or more detent mechanisms (such as shown in FIGS. 17 and 18), collet arrangements (such as shown in FIGS. 19 and 20), and/or other features may act in conjunction with the pressure to keep the indexing member 290 in the intermediate positions 2106 and 2114, corresponding to the mandrel 210 being maintained in the collapsed position shown in FIGS. 3 and 4. The mandrel 210 may be repositioned between the multiple static positions in this manner without utilizing a fishing-type and/or other mechanical apparatus extending between from the valve 156 to the surface.

Figure 22:
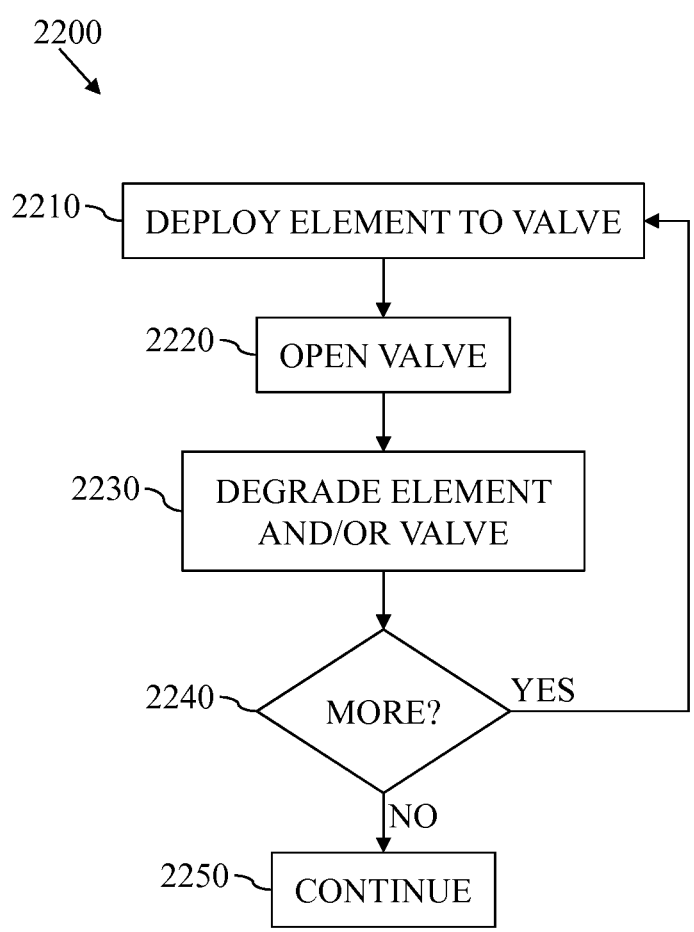
FIG. 22 is a flow-chart diagram of at least a portion of a method according to one or more aspects of the present disclosure.

FIG. 22 is a flow-chart diagram of at least a portion of a method (2200) according to one or more aspects of the present disclosure. The method (2200) may be executed utilizing apparatus according to one or more aspects described above and/or shown in one or more of FIGS. 1-21. The method (2200) may, for example, be utilized to switch between a circulation mode and a milling and/or other non-circulation mode.

Referring to FIGS. 1-5 and 22, collectively, an element 230 may be dropped and/or otherwise deployed (2210) into the wellbore 110 at the surface 115 in a manner permitting the element 230 to land on a valve seat 220 of an MCCV 156. The element 230 and/or the valve seat 220 may partially or substantially comprise magnesium and/or another composition intended to degrade in the presence of water and/or another predetermined fluid. The element 230 may be substantially spherical, conical, cylindrical, toroidal, and/or otherwise shaped, including implementations in which a first portion of the element 230 is substantially spherical, conical, cylindrical, toroidal, and/or otherwise shaped but a second portion has a different shape. The element 230 may also include an uphole-facing recess that is acted upon by the fluid being pumped from the surface 115. The element 230 and/or the valve seat 220 may each have multiple portions that degrade at different rates in the presence of the same or different degradation fluids. Deploying (2210) the element 230 may also comprise deploying more than one element, including to more than one valve seat 220.

After the element 230 lands on the valve seat 220, one or more radial apertures and/or other ports 215 of the MCCV 156 may be opened (2220). For example, the pressure of the fluid being pumped from the surface 115 through the conveyance string 140 to the MMCV 156 may be increased by an amount sufficient to axially translate the mandrel 210 and/or the valve seat 220. However, the fluid flow and/or pressure utilized to transmit the element 230 from the surface 115 to the MMCV 156 may be sufficient to cause the axial translation. In either case, the translation may move the valve seat 220 and/or mandrel 210, and/or a flange member and/or other component of the valve seat 220 and/or mandrel 210, away from the one or more radial apertures and/or other portions 215 being opened (2220). Consequently, fluid being pumped from the surface 115 will bypass the hydraulic tool 154 coupled to or otherwise positioned downhole of the MMCV 156.

At least a portion of at least one of the element 230 and the valve seat 220, and/or at least a portion of at least one of multiple similar or different instances of the element 230 and/or the valve seat 220, may then be degraded (2230) while the one or more radial apertures and/or other ports 215 are held open by the pressure of the fluid being pumped from the surface 115. Such degradation (2230) may utilize the same fluid composition and/or pressure utilized to deploy (2210) the element and/or open (2220) the one or more ports. However, the degradation (2230) may also utilize an additional or different fluid composition and/or pressure utilized to deploy (2210) the element and/or open (2220) the one or more ports.

The degradation (2230) may be performed for a predetermined or other period of time sufficient for the element 230 and/or valve seat 220 to permit the passage of fluid being pumped from the surface 115 to the hydraulic tool 154. For example, such occurrence may be detected as a pressure, flow rate, and/or composition change detected at the surface 115. Operations utilizing the hydraulic tool 154 may then commence, or continue, as applicable.

If it is subsequently determined (2240) that additional ports and/or MCCVs are to be cycled, one or more additional elements may again be deployed (2210), as described above. Where multiple MCCVs are utilized, they may be substantially similar or different, and each may implement one or more aspects described above and/or shown in one or more of FIGS. 1-21. If it is determined (2240) that additional ports and/or MCCVs are not to be cycled, then operations utilizing the hydraulic tool 154 and/or other tools of the downhole tool 150 and/or other operations may be continued (2250).

In view of the entirety of the present disclosure, including FIGS. 1-22, a person having ordinary skill in the art will readily recognize that the present disclosure introduces an apparatus comprising: a downhole tool operable for conveyance via tubing within a wellbore extending from a wellsite, wherein the downhole tool comprises: a hydraulic tool driven by fluid pumped to the hydraulic tool via the tubing; and a valve comprising: a valve seat having a passage directing the fluid from the tubing to the hydraulic tool; and an element substantially preventing the fluid from flowing through the passage, wherein at least a portion of at least one of the valve seat and the element is degradable.

The element may be substantially spherical, conical, cylindrical, or toroidal. The element may comprise first and second portions of different shape, and at least one of the first and second portions may be substantially spherical, conical, cylindrical, or toroidal.

The element may comprise an uphole-facing recess acted upon by the fluid.

The element may comprise a first portion that is degradable and a second portion that is not degradable. The element may comprise a first portion that is degradable at a first non-zero rate and a second portion that is degradable at a second non-zero rate that is less than the first non-zero rate.

The element may be a first element, and the valve may comprise a plurality of elements that includes the first element. Each of the plurality of elements may be substantially similar in shape. At least a portion of the first element may have a first composition, and at least a portion of a second one of the plurality of elements may have a second composition that is not the first composition. The first and second compositions may be degradable. The first composition may be degradable at a first non-zero rate and the second composition may be degradable at a second non-zero rate.

The valve seat may comprise a first portion that is degradable and a second portion that is not degradable. The valve seat may comprise a first portion that is degradable at a first non-zero rate and a second portion that is degradable at a second non-zero rate that is less than the first non-zero rate.

The valve seat may be a first valve seat, and the valve may comprise a plurality of valve seats that includes the first valve seat. Each of the plurality of valve seats may be substantially similar in shape. At least a portion of the first valve seat may have a first composition, and at least a portion of a second one of the plurality of valve seats may have a second composition that is not the first composition. The first and second compositions may be degradable. The first composition may be degradable at a first non-zero rate and the second composition may be degradable at a second non-zero rate.

The valve may further comprise: a body having a plurality of radial apertures permitting communication of the fluid from inside the valve to the wellbore; and a closure member slidable within the body between a first position substantially obstructing fluid flow through the plurality of radial apertures and a second position substantially not obstructing fluid flow through the plurality of radial apertures. The valve seat may be slidable within the body, and the closure member may be coupled to the valve seat. The valve seat may be slidable within the body, and the closure member may be integral to the valve seat.

The valve may further comprise a biasing member urging the closure member away from the second position and towards the first position. The valve may further comprise: a mandrel coupled with the valve seat and slidable within the body; and a chamber containing the biasing member, wherein the chamber is at least partially defined by surfaces of the body and the mandrel.

The valve may further comprise a mandrel coupled with the valve seat and slidable within the body, and the mandrel and the body may engage when the closure member is in the second position. At least one of the mandrel and the body may comprise a detent mechanism by which the mandrel and the body engage when the closure member is in the second position. At least one of the mandrel and the body may comprise a collet arrangement by which the mandrel and the body engage when the closure member is in the second position.

The valve may further comprise a biasing member urging the closure member away from the second position and towards the first position with a force sufficient to disengage the mandrel from the body when the element does not substantially prevent fluid from flowing through the valve seat passage.

The valve may further comprise: a mandrel coupled with the valve seat and slidable within the body; an indexing track recessed within a first one of the mandrel and the body; and an indexing member extending into the indexing track from a second one of the mandrel and the body, wherein the indexing member is slidable within the indexing track in response to relative axial translation of the mandrel and the body. The indexing member may be slidable within the indexing track between a plurality of static positions each corresponding to an axial position of the mandrel relative to the body. The plurality of radial apertures may include apertures at each of a plurality of different axial positions along the body, and each of the plurality of static positions of the indexing member within the indexing track may correspond to one of the plurality of axial positions.

The apparatus may further comprise a control line extending through the valve seat. The control line may extend through the element. The control line may comprise at least one of an electric control line, a fiber-optic control line, and a hydraulic control line, and combinations thereof.

The present disclosure also introduces a method comprising: deploying an element within a conveyance string extending to a downhole tool in a wellbore, wherein the downhole tool comprises: a hydraulic tool driven by fluid pumped to the hydraulic tool via the conveyance string; and a valve coupled between the conveyance string and the hydraulic tool and comprising a valve seat having a passage directing the fluid from the conveyance string to the hydraulic tool, wherein deploying the element comprises landing the element on the valve seat such that the element substantially obstructs flow of the fluid through the valve seat passage; opening the valve to direct the flow of the fluid around the hydraulic tool, wherein opening the valve utilizes pressure generated in response to the element obstructing the flow of the fluid through the valve seat passage; and degrading at least a portion of at least one of the element and the valve seat by an amount sufficient to permit the element to pass through the valve seat passage.

The conveyance string may comprise coiled tubing.

The hydraulic tool may be a milling tool.

The valve may be a multi-cycle circulation valve (MCCV).

The valve may further comprise a plurality of apertures, wherein a closure member carried with the valve seat may obstruct the flow of the fluid through the plurality of apertures when in a first position, and wherein opening the valve may include utilizing the pressure to establish a hydraulic tool bypass by sliding the closure member towards a second position away from the plurality of apertures such that the fluid flows into the wellbore through the plurality of apertures while bypassing the hydraulic tool. Degrading at least a portion of at least one of the element and the valve seat by an amount sufficient to permit the element to pass through the valve seat passage may permit the closure member to return to the first position obstructing the flow of the fluid through the plurality of apertures.

Degrading at least a portion of at least one of the element and the valve seat may include degrading at least a portion of the element and at least a portion of the valve seat.

Degrading at least a portion of at least one of the element and the valve seat may comprise degrading at least a magnesium-comprising portion of at least one of the element and the valve seat by exposure to a low-pH fluid.

Degrading at least a portion of at least one of the element and the valve seat may comprise degrading at least a certain portion of at least one of the element and the valve seat by exposure to a low-pH fluid, wherein the certain portion may substantially comprises a highly reactive aluminum alloy.

Degrading at least a portion of at least one of the element and the valve seat may comprise degrading at least a calcium-comprising portion of at least one of the element and the valve seat by exposure to a fluid comprising water.

Deploying the element may comprise deploying a plurality of elements.

Deploying the element may comprise deploying a plurality of substantially similar elements.

The foregoing outlines features of several embodiments so that a person having ordinary skill in the art may better understand the aspects of the present disclosure. A person having ordinary skill in the art should appreciate that they may readily use the present disclosure as a basis for designing or modifying other processes and structures for carrying out the same purposes and/or achieving the same advantages of the embodiments introduced herein. A person having ordinary skill in the art should also realize that such equivalent constructions do not depart from the spirit and scope of the present disclosure, and that they may make various changes, substitutions and alterations herein without departing from the spirit and scope of the present disclosure.

The Abstract at the end of this disclosure is provided to comply with 37 C.F.R. § 1.72(b) to allow the reader to quickly ascertain the nature of the technical disclosure. It is submitted with the understanding that it will not be used to interpret or limit the scope or meaning of the claims.

What is claimed is:

1. An apparatus, comprising:
a downhole tool operable for conveyance via tubing within a wellbore extending from a wellsite, wherein the downhole tool comprises:
a hydraulic tool driven by fluid pumped to the hydraulic tool via the tubing; and a valve comprising:
a valve seat having a passage directing the fluid from the tubing to the hydraulic tool;
an element substantially preventing the fluid from flowing through the passage, wherein at least a portion of at least one of the valve seat and the element is degradable;
a body having a plurality of radial apertures extending radially through a wall of the body and permitting a flow of the fluid from inside the valve to the wellbore;
a closure member slidable within the body between a first position substantially obstructing fluid flow through the plurality of radial apertures and a second position substantially not obstructing fluid flow through the plurality of radial apertures; and
a mandrel coupled with the valve seat and slidable within the body, wherein the mandrel is configured to engage with the body to maintain the closure member in the second position, wherein at least one of the mandrel and the body comprises a collet arrangement by which the mandrel and the body engage when the closure member is in the second position, wherein the collet arrangement is positioned radially within the wall of the body, wherein the collet arrangement comprises flexible fingers positioned radially within the wall of the body and positionally fixed relative to the body, wherein the flexible fingers are configured to deflect radially and to engage notches or recesses in the mandrel.

2. The apparatus of claim 1 wherein the element is substantially spherical.

3. The apparatus of claim 1 wherein the element is substantially conical.

4. The apparatus of claim 1 wherein the element is substantially cylindrical.

5. The apparatus of claim 1 wherein the element is substantially toroidal.

6. The apparatus of claim 1 wherein the element comprises first and second portions of different shape, and wherein at least one of the first and second portions is substantially spherical, conical, cylindrical, or toroidal.

7. The apparatus of claim 1 wherein the element includes an uphole-facing recess acted upon by the fluid.

8. The apparatus of claim 1 wherein the element comprises a first portion that is degradable and a second portion that is not degradable.

9. The apparatus of claim 1 wherein the element comprises a first portion that is degradable at a first non-zero rate and a second portion that is degradable at a second non-zero rate that is less than the first non-zero rate.

10. The apparatus of claim 1 wherein the element is a first element, and wherein the valve comprises a plurality of elements that includes the first element.

11. The apparatus of claim 10 wherein each of the plurality of elements is substantially similar in shape.

12. The apparatus of claim 10 where at least a portion of the first element has a first composition, and wherein at least a portion of a second one of the plurality of elements has a second composition that is not the first composition.

13. The apparatus of claim 12 wherein the first and second compositions are degradable.

14. The apparatus of claim 13 wherein the first composition is degradable at a first non-zero rate and the second composition is degradable at a second non-zero rate.

15. The apparatus of claim 1 wherein the valve seat comprises a first portion that is degradable and a second portion that is not degradable.

16. The apparatus of claim 1 wherein the valve seat comprises a first portion that is degradable at a first non-zero rate and a second portion that is degradable at a second non-zero rate that is less than the first non-zero rate.

17. The apparatus of claim 1 wherein the valve seat is a first valve seat, and wherein the valve comprises a plurality of valve seats that includes the first valve seat.

18. The apparatus of claim 17 wherein each of the plurality of valve seats is substantially similar in shape.

19. The apparatus of claim 17 where at least a portion of the first valve seat has a first composition, and wherein at least a portion of a second one of the plurality of valve seats has a second composition that is not the first composition.

20. The apparatus of claim 19 wherein the first and second compositions are degradable.

21. The apparatus of claim 20 wherein the first composition is degradable at a first non-zero rate and the second composition is degradable at a second non-zero rate.

22. The apparatus of claim 1 wherein the valve seat is slidable within the body, and wherein the closure member is coupled to the valve seat.

23. The apparatus of claim 1 wherein the valve seat is slidable within the body, and wherein the closure member is integral to the valve seat.

24. The apparatus of claim 1 wherein the valve further comprises a biasing member urging the closure member away from the second position and towards the first position.

25. The apparatus of claim 24 wherein the valve further comprises:
a chamber containing the biasing member, wherein the chamber is at least partially defined by surfaces of the body and the mandrel.

26. The apparatus of claim 1 wherein the valve further comprises a biasing member urging the closure member away from the second position and towards the first position with a force sufficient to disengage the mandrel from the body when the element does not substantially prevent fluid from flowing through a valve seat passage.

27. The apparatus of claim 1 wherein the valve further comprises:
an indexing track recessed within a first one of the mandrel and the body; and
an indexing member extending into the indexing track from a second one of the mandrel and the body, wherein the indexing member is slidable within the indexing track in response to relative axial translation of the mandrel and the body.

28. The apparatus of claim 27 wherein the indexing member is slidable within the indexing track between a plurality of static positions each corresponding to an axial position of the mandrel relative to the body.

29. The apparatus of claim 28 wherein the plurality of radial apertures includes apertures at each of a plurality of different axial positions along the body, and wherein each of the plurality of static positions of the indexing member within the indexing track corresponds to one of the plurality of different axial positions.

30. The apparatus of claim 1 further comprising a control line extending through the valve seat.

31. The apparatus of claim 30 wherein the control line extends through the element.

32. The apparatus of claim 30 wherein the control line comprises at least one of an electric control line, a fiber-optic control line, and a hydraulic control line.

33. A method, comprising:
deploying an element within a conveyance string extending to a downhole tool in a wellbore, wherein the downhole tool comprises:
  a hydraulic tool driven by fluid pumped to the hydraulic tool via the conveyance string; and
  a valve coupled between the conveyance string and the hydraulic tool and comprising a valve seat having a passage directing the fluid from the conveyance string to the hydraulic tool, wherein deploying the element comprises landing the element on the valve seat such that the element substantially obstructs flow of the fluid through the valve seat passage;
opening the valve to direct the flow of the fluid around the hydraulic tool, wherein opening the valve utilizes pressure generated in response to the element obstructing the flow of the fluid through a valve seat passage;
maintaining the valve in an open position via interaction of a collet arrangement positioned radially within a wall of a body of the valve, wherein maintaining the valve in the open position via interaction of the collet arrangement comprises flexible fingers deflecting radially to engage notches or recesses in the mandrel, wherein the flexible fingers are positioned radially within the wall of the body and positionally fixed relative to the body; and
degrading at least a portion of at least one of the element and the valve seat by an amount sufficient to permit the element to pass through the valve seat passage.

34. The method of claim 33 wherein the conveyance string comprises coiled tubing.

35. The method of claim 33 wherein the hydraulic tool is a milling tool.

36. The method of claim 33 wherein the valve is a multi-cycle circulation valve (MCCV).

37. The method of claim 33 wherein the valve further comprises a plurality of apertures, wherein a closure member carried with the valve seat obstructs the flow of the fluid through the plurality of apertures when in a first position, and wherein opening the valve includes utilizing the pressure to establish a hydraulic tool bypass by sliding the closure member towards a second position away from the plurality of apertures such that the fluid flows into the wellbore through the plurality of apertures while bypassing the hydraulic tool.

38. The method of claim 37 wherein degrading at least a portion of at least one of the element and the valve seat by an amount sufficient to permit the element to pass through the valve seat passage permits the closure member to return to the first position obstructing the flow of the fluid through the plurality of apertures.

39. The method of claim 33 wherein degrading at least a portion of at least one of the element and the valve seat includes degrading at least a portion of the element and at least a portion of the valve seat.

40. The method of claim 33 wherein degrading at least a portion of at least one of the element and the valve seat comprises degrading at least a magnesium-comprising portion of at least one of the element and the valve seat by exposure to a low-pH fluid.

41. The method of claim 33 wherein degrading at least a portion of at least one of the element and the valve seat comprises degrading at least a certain portion of at least one of the element and the valve seat by exposure to a low-pH fluid, wherein the certain portion substantially comprises a highly reactive aluminum alloy.

42. The method of claim 33 wherein degrading at least a portion of at least one of the element and the valve seat comprises degrading at least a calcium-comprising portion of at least one of the element and the valve seat by exposure to a fluid comprising water.

43. The method of claim 33 wherein deploying the element comprises deploying a plurality of elements.

44. The method of claim 33 wherein deploying the element comprises deploying a plurality of substantially similar elements.

45. The method of claim 33, comprising biasing the valve into a closed position via a biasing member of the valve.

46. The method of claim 45, wherein the biasing member is configured to overcome the interaction of a mandrel of the valve and the body of the valve upon degradation of the at least the portion of the at least one of the element and the valve seat.

* * * * *